(12) United States Patent
Su (10) Patent No.: US 8,926,163 B2
(45) Date of Patent: Jan. 6, 2015

(54) LIQUID CRYSTAL DISPLAY AND THE BACKLIGHT MODULE THEREOF

(71) Applicant: Shenzhen China Star Optoelectronics Technology Co., Ltd., Shenzhen (CN)

(72) Inventor: Zanjia Su, Shenzhen (CN)

(73) Assignee: Shenzhen China Star Optoelectronics Technology Co., Ltd, Shenzhen, Guangdong (CN)

( * ) Notice: Subject to any disclaimer, the term of this patent is extended or adjusted under 35 U.S.C. 154(b) by 112 days.

(21) Appl. No.: 13/697,969

(22) PCT Filed: Oct. 26, 2012

(86) PCT No.: PCT/CN2012/083608
§ 371 (c)(1),
(2) Date: Nov. 14, 2012

(87) PCT Pub. No.: WO2014/063364
PCT Pub. Date: May 1, 2014

(65) Prior Publication Data
US 2014/0112018 A1 Apr. 24, 2014

(30) Foreign Application Priority Data
Oct. 24, 2012 (CN) .......................... 2012 1 0410016

(51) Int. Cl.
*F21V 7/04* (2006.01)
*F21V 8/00* (2006.01)
*G02F 1/1335* (2006.01)

(52) U.S. Cl.
CPC ............ *G02B 6/0011* (2013.01); *G02F 1/1335* (2013.01)
USPC ........................... 362/633; 362/97.1; 362/615

(58) Field of Classification Search
USPC ............... 362/97.1, 97.2, 611, 612, 613, 615, 362/616, 633, 634
See application file for complete search history.

(56) References Cited

U.S. PATENT DOCUMENTS

| | | | | |
|---|---|---|---|---|
| 7,695,182 B2* | 4/2010 | Iwasaki | .......................... | 362/633 |
| 7,771,108 B2* | 8/2010 | Iwasaki | .......................... | 362/634 |
| 8,297,823 B2* | 10/2012 | Cho et al. | ....................... | 362/606 |
| 8,388,176 B2* | 3/2013 | Kasai | ............................. | 362/232 |
| 8,636,399 B2* | 1/2014 | Cho et al. | ....................... | 362/606 |
| 8,777,439 B2* | 7/2014 | Kuromizu | ..................... | 362/97.4 |

* cited by examiner

*Primary Examiner* — John A Ward
(74) *Attorney, Agent, or Firm* — Andrew C. Cheng (57) ABSTRACT

A liquid crystal display and the backlight module thereof are disclosed. The backlight module includes a substrate, a light guiding plate, a first pillar, a light source, at least two separating pieces, and an elastic piece. The separating pieces keep the distance between the light guiding plate and the lighting assembly of the light source equals to a minimum distance. A first end of the elastic piece connects one end of the first pillar passing through the crack of the substrate, and a second end of the elastic piece connects to the substrate. The elastic piece pushes the light guiding plate via the first pillar to move toward the light source until the distance between the light guiding plate and the lighting assembly of the light source equals to the minimum distance. The liquid crystal device and the backlight module are capable of keeping the coupling distance of the backlight module remain unchanged.

14 Claims, 6 Drawing Sheets

LIQUID CRYSTAL DISPLAY AND THE BACKLIGHT MODULE THEREOF

BACKGROUND OF THE INVENTION

1. Field of the Invention

Embodiments of the present disclosure relate to display technology, and more particularly to a liquid crystal display and the backlight module thereof.

2. Discussion of the Related Art

Coupling efficiency, which relates to the light efficiency emitted from LEDs to a light guiding plate, is the most important factor affecting the brightness of edge-in backlight modules. The coupling efficiency depends on a coupling distance, which indicates the distance between light emitting surfaces of the LEDs and the light incident surfaces of the light guiding plates.

Figure 1:
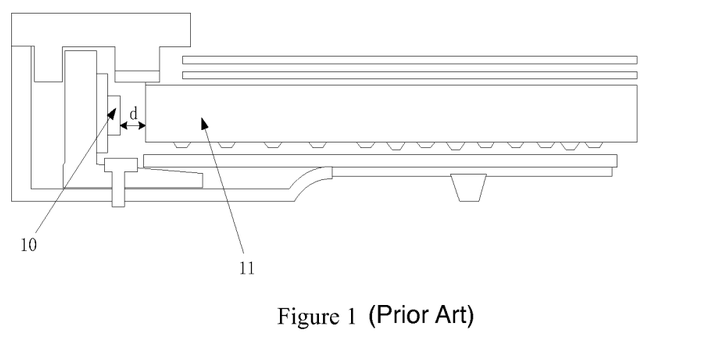
FIG. 1 is a cross-sectional view of a typical edge-in backlight module.
Figure 2:
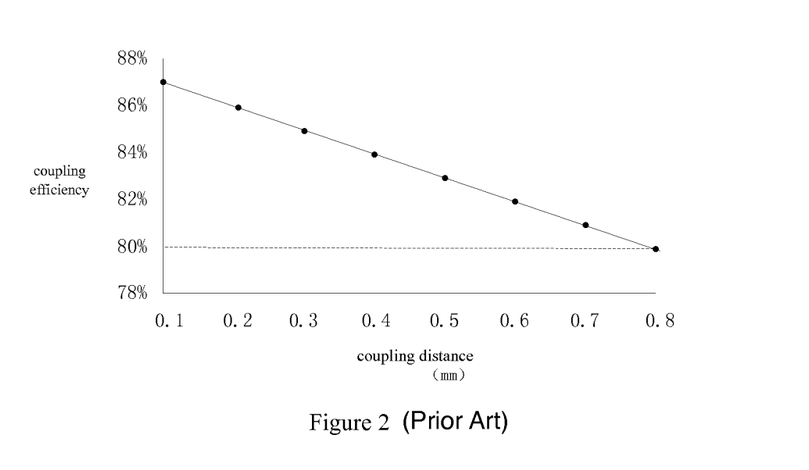
FIG. 2 is a line diagram showing a relationship between the coupling effect and the coupling distance when the thickness of the light guiding plate is equal to 2 mm.

FIG. 1 is a cross-sectional view of a typical edge-in backlight module. The "d" indicates the coupling distance between a LED 10 and a light guiding plate 11. FIG. 2 is a line diagram showing a relationship between the coupling effect and the coupling distance when the thickness of the light guiding plate is equal to 2 mm. As shown in FIG. 2, the coupling effect reduces from 87 percents to 80 percents when the coupling distance is increased from 0.1 mm to 0.8 mm. At the same time, the brightness of the backlight module is reduced from 300 nits to 276 nits.

However, the coupling distance may be slightly different from a desired value due to parameters of mechanical components, assembly deviations, and so on. Such differences may result in a larger coupling distance and the brightness of the backlight module is affected.

SUMMARY

The object of the claimed invention is to provide a liquid crystal device and the backlight module thereof for keeping the coupling distance and the brightness of the backlight module the same.

In one aspect, a backlight module includes a substrate, a light guiding plate, a first pillar, a light source, at least two separating pieces, and an elastic piece. Wherein the light guiding plate is arranged on the substrate, the light guiding plate includes a first edge, a second edge, a third edge and a fourth edge connected to each other head to tail, the light source is arranged adjacent to the first edge, the second edge or the fourth edge of the light guiding plate has a fixing slot or a fixing hole. The light source includes a base and a lighting assembly arranged on the base, the lighting assembly faces toward the first edge of the light guiding plate, the separating pieces are arranged between the first edge of the light guiding plate and the base of the light source such that the first edge of the light guiding plate and the lighting assembly of the light source have a minimum distance. At least portions of the first pillar are fixed on the fixing slot or the fixing hole of the light guiding plate, at least portions of the first pillar protrudes from the light guiding plate so that the protruded portions of the first pillar pass through a crack of the substrate. The elastic piece is arranged on a first surface of the substrate, the first surface is farther to the light guiding plate than the other surface, the elastic piece includes a first end, and a second end, the first end of the elastic piece connects one end of the first pillar passing through the crack of the substrate, the second end connects to the substrate directly or indirectly, and the second end of the elastic piece is farther to the first edge of the light guiding plate than the first end. The elastic piece pushes the light guiding plate via the first pillar to move toward the light source until the distance between the light guiding plate and the lighting assembly of the light source equals to the minimum distance, and the elastic piece remains in a compressed state. A lengthy direction of the crack is the same with a moving direction of the light guiding plate toward the light source. A thickness of the at least two separating pieces is equal to or larger than the thickness of the light guiding plate, and the at least two separating pieces respectively correspond to two sides of the first edge of the light guiding plate.

Wherein the backlight modules further includes a second pillar vertically fixed on the first surface of the substrate, and the second end of the elastic piece connects the second pillar.

Wherein the elastic piece is springs.

Wherein the backlight module further includes at least one optical film arranged on the first surface of the light guiding plate.

In another aspect, a backlight module includes a substrate, a light guiding plate, a first pillar, a light source, separating pieces, and an elastic piece. Wherein the light guiding plate is arranged on the substrate, the light guiding plate includes a first edge, a second edge, a third edge and a fourth edge connected to each other head to tail, the light source is arranged adjacent to the first edge, the second edge or the fourth edge of the light guiding plate has a fixing slot or a fixing hole. The light source includes a base and a lighting assembly arranged on the base, the lighting assembly faces toward the first edge of the light guiding plate, the separating piece is arranged between the first edge of the light guiding plate and the base of the light source such that the first edge of the light guiding plate and the lighting assembly of the light source have a minimum distance. At least portions of the first pillar are fixed on the fixing slot or the fixing hole of the light guiding plate, at least portions of the first pillar protrudes from the light guiding plate so that the protruded portions of the first pillar pass through a crack of the substrate. The elastic piece is arranged on a first surface of the substrate, the first surface is farther to the light guiding plate than the other surface, the elastic piece includes a first end, and a second end, the first end of the elastic piece connects one end of the first pillar passing through the crack of the substrate, the second end connects to the substrate directly or indirectly, the second end of the elastic piece is farther to the first edge of the light guiding plate than the first end. The elastic piece pushes the light guiding plate via the first pillar to move toward the light source until the distance between the light guiding plate and the lighting assembly of the light source equals to the minimum distance, and the elastic piece remains in a compressed state. A lengthy direction of the crack is the same with a moving direction of the light guiding plate toward the light source.

Wherein a thickness of the at least two separating pieces is equal to or larger than the thickness of the light guiding plate.

Wherein the backlight modules further includes a second pillar vertically fixed on the first surface of the substrate, and the second end of the elastic piece connects the second pillar.

Wherein the elastic piece is springs.

Wherein the backlight modules includes at least two separating pieces respectively correspond to two sides of the first edge of the light guiding plate.

Wherein the backlight module further includes at least one optical film arranged on the first surface of the light guiding plate.

In another aspect, a liquid crystal display includes a backlight module including a substrate, a light guiding plate, a first pillar, a light source, separating pieces, and an elastic piece. Wherein the light guiding plate is arranged on the substrate, the light guiding plate includes a first edge, a second edge, a third edge and a fourth edge connected to each other head to tail, the light source is arranged adjacent to the first edge, the second edge or the fourth edge of the light guiding plate has a fixing slot or a fixing hole. The light source includes a base and a lighting assembly arranged on the base, the lighting assembly faces toward the first edge of the light guiding plate, the separating piece is arranged between the first edge of the light guiding plate and the base of the light source such that the first edge of the light guiding plate and the lighting assembly of the light source have a minimum distance. At least portions of the first pillar are fixed on the fixing slot or the fixing hole of the light guiding plate, at least portions of the first pillar protrudes from the light guiding plate so that the protruded portions of the first pillar pass through a crack of the substrate. The elastic piece is arranged on a first surface of the substrate, the first surface is farther to the light guiding plate than the other surface, the elastic piece includes a first end, and a second end, the first end of the elastic piece connects one end of the first pillar passing through the crack of the substrate, the second end connects to the substrate directly or indirectly, the second end of the elastic piece is farther to the first edge of the light guiding plate than the first end. The elastic piece pushes the light guiding plate via the first pillar to move toward the light source until the distance between the light guiding plate and the lighting assembly of the light source equals to the minimum distance, and the elastic piece remains in a compressed state. A lengthy direction of the crack is the same with a moving direction of the light guiding plate toward the light source. A display panel arranged on the first surface of the light guiding plate.

Wherein a thickness of the at least two separating pieces is equal to or larger than the thickness of the light guiding plate.

Wherein the backlight modules further includes a second pillar vertically fixed on the first surface of the substrate, and the second end of the elastic piece connects the second pillar.

Wherein the elastic piece is springs.

DETAILED DESCRIPTION OF THE EMBODIMENTS

Embodiments of the invention will now be described more fully hereinafter with reference to the accompanying drawings, in which embodiments of the invention are shown.

Figure 3:
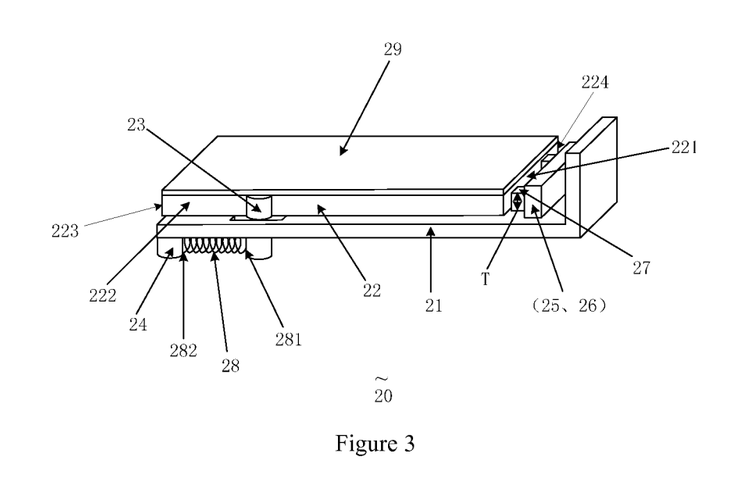
FIG. 3 is a perspective view of the backlight module in accordance with one embodiment.
Figure 4:
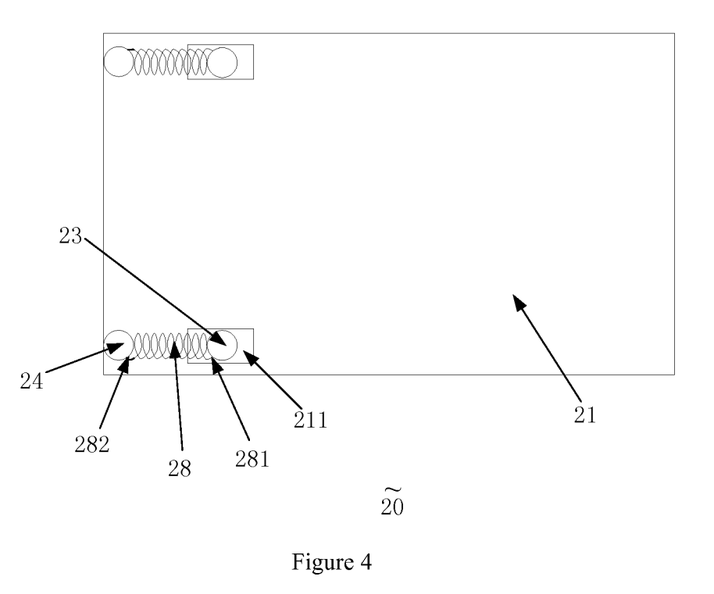
FIG. 4 is a bottom view of the backlight module in accordance with one embodiment.
Figure 5:
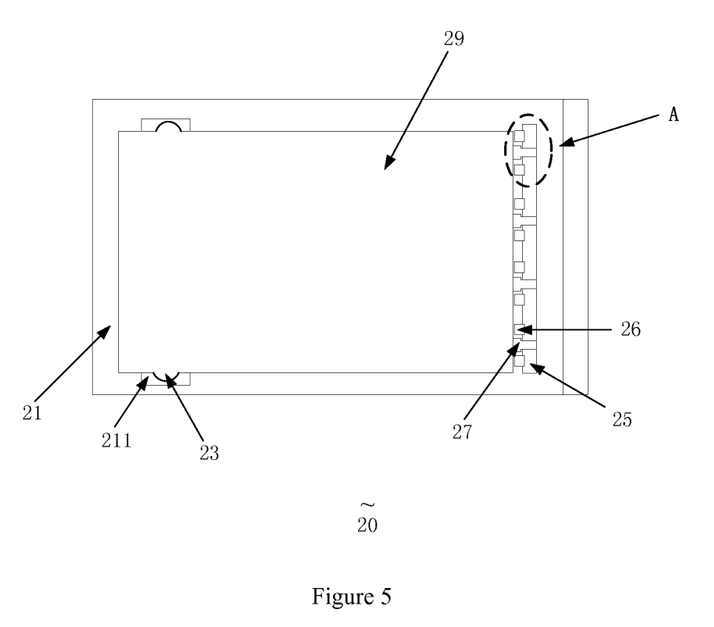
FIG. 5 is a top view of the backlight module in accordance with one embodiment.
Figure 6:
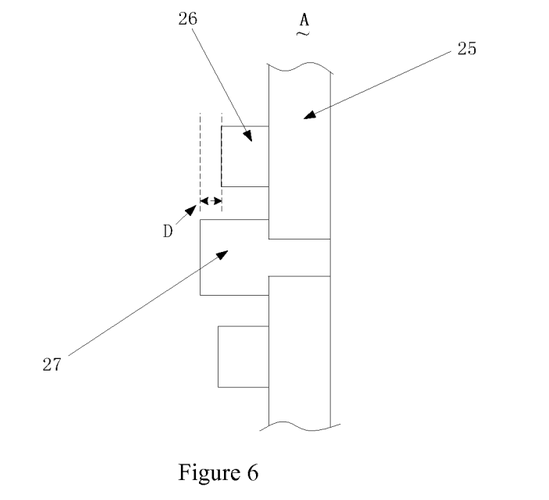
FIG. 6 is an enlarged view of portion A of FIG. 5.
Figure 7:
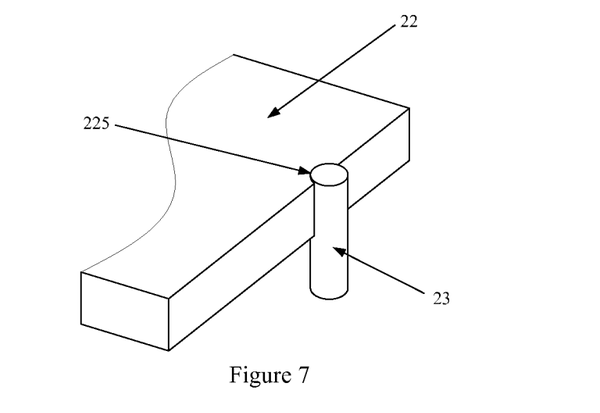
FIG. 7 is a perspective view of the first pillar of the backlight module in accordance with one embodiment.

Referring to FIGS. 3-7. FIG. 3 is a perspective view of the backlight module in accordance with one embodiment. FIG. 4 is a bottom view Of the backlight module in accordance with one embodiment. FIG. 5 is a top view of the backlight module in accordance with one embodiment. FIG. 6 is an enlarged view of portion A of FIG. 5. FIG. 7 is a perspective view of the first pillar of the backlight module in accordance with one embodiment.

The backlight module 20 includes a substrate 21, a light guiding plate 22, at least one optical film 29, a first pillar 23, a second pillar 24, a light source 25, 26, a separating piece 27, and elastic pieces 28.

The light guiding plate 22 is arranged on the substrate 21. The light guiding plate 22 includes a first edge 221, a second edge 222, a third edge 223, and a fourth edge 224 connected to each other head to tail. The light source 25, 26 is arranged adjacent to the first edge 221. The second edge 222 or the fourth edge 224 of the light guiding plate 22 has a fixing slot 225 or a fixing hole. The optical film 29 is arranged on a first surface of the light guiding plate 22, and the first surface is farther to the substrate 21 than the other surface. The optical film 29 may be an optical diffuser film or an optical brightness enhancement film.

The light source 25, 26 includes a base 25 and a lighting assembly 26 arranged on the base 25. The lighting assembly 26 faces toward the first edge 221 of the light guiding plate 22. The separating pieces 27 are arranged between the first edge 221 of the light guiding plate 22 and the base 25 of the light source such that the first edge 221 of the light guiding plate 22 and the lighting assembly 26 of the light source have a minimum distance D. The minimum distance D equals to the difference between the height of the separating piece 27 and that of the lighting assembly 26. In other words, the minimum distance D, which is also the coupling distance, equals to the distance between the top of the lighting assembly 26 and the first edge 221 of the light guiding plate 22.

The values of the minimum distance D may be adjusted accordingly. The light source may be a light bar. The lighting assembly 26 may be light emitting diode (LED). The separating piece 27 may be screws or other assembly with rigidity.

The thickness T of the separating piece 27 is equal to or larger than the thickness of the light guiding plate so as to obtain the minimum distance D. In one embodiment, the backlight module 20 includes at least two separating pieces 27 respectively correspond to two sides of the first edge 221 of the light guiding plate 22. The separating pieces 27 may be arranged on the base 25 of the light source. In other embodiments, the separating piece 27 may be arranged between the first edge 221 of the light guiding plate 22 and the base 25 of the light source.

At least portions of the first pillar 23 are fixed on the fixing slot 225 or the fixing hole of the light guiding plate 22. In addition, at least portions of the first pillar 23 protrudes from the light guiding plate 22 so that the protruded portions of the first pillar 23 pass through a crack 211 of the substrate 21. The length and the width of the crack 211 are larger than the diameter of the first pillar 23. The lengthy direction of the crack 211 is the same with the moving direction of the light guiding plate 22 toward the light source 25, 26. In addition, the length of the crack 211 allows the first pillar 23 to move toward the light source 25, 26 until the distance between the first edge 221 of the light guiding plate 22 and the lighting assembly 26 of the light source equals to the minimum distance D.

The second pillar 24 is vertically fixed on a first surface of the substrate 21, and the first surface is farther to the light guiding plate 22 than the other surface. The elastic piece 28 is also arranged on the first surface of the substrate 21. The elastic piece 28 includes a first end 281, and a second end 282. The first end 281 of the elastic piece 28 connects one end of the first pillar 23 passing through the crack 211 of the substrate 21. The second end 282 of the elastic piece 28 connects the second pillar 24. The second end 282 of the elastic piece 28 is farther to the first edge 221 of the light guiding plate 22 than the first end 281. The elastic piece 28 may be springs or other elastic components. In other embodiments, the second pillar 24 may be rectangular blocks or other components with different shapes.

The elastic piece 28 remains in a compressed state before being affected by environmental factors, such as thermo, gravity, shakes, and so on. The elastic force of the elastic piece 28 push the first edge 221 of the light guiding plate 22 to contact the separating pieces 27 such that the distance between the light guiding plate 22 and the lighting assembly 26 of the light source equals to the minimum distance D. When the light guiding plate 22 is affected by the above environmental factors, the elastic force may counteract the environmental factors so that the distance between the light guiding plate 22 and the light source remains unchanged. When the elastic force of the elastic piece 28 is not enough to counteract the above environmental factors, the light guiding plate 22 Moves toward a direction farther to the light source 25, 26. The first pillar 23 on the light guiding plate 22 compresses the elastic piece 28, and thus a larger elastic force is generated from the elastic piece 28. The elastic force prevents the light guiding plate 22 from moving farther to the light source 25, 26. After the above environmental factors disappear, the elastic piece 28 pushes the first pillar 23 so that the light guiding plate 22 moves toward the light source 25. 26 until the distance between the light guiding plate 22 and the lighting assembly 26 of the light source equals to the minimum distance D. That is, the first edge 221 of the light guiding plate 22 contacts the separating piece 27. At the same time, the elastic piece 28 remains in the compressed state to ensure the light guiding plate 22 continuously contacts the separating piece 27.

In addition, by arranging the fixing slot 225 or the fixing hole on the light guiding plate 22, the stability between the light guiding plate 22 and the first pillar 23 is enhanced and the optical quality is ensured.

By adopting the above arrangement, the light guiding plate 22 is prevented from being tilted. Specifically, when the thickness of the separating piece 27 is smaller than that of the light guiding plate 22, the inflation of the light guiding plate 22 may cause a top portion of the light incident surface of the light guiding plate 22 tilt. In addition, by arranging at least two separating pieces 27 on two sides of the first edge 221 of the light guiding plate 22 and by configuring the thickness of the separating pieces 27 to be the same or larger than that of the light guiding plate 22, the distance between the light guiding plate 22 and the lighting, assembly 26 remains the same with the minimum distance D.

In other embodiments, the thickness of the separating pieces 27 may be smaller than that of the light guiding plate 22. The separating pieces 27 may prevent the first edge 221 from tilting toward the light source 25, 26. In one aspect, the portions of the light guiding plate 22 farther to the light source 25, 26 is supported by the substrate so that the light guiding plate 22 does not tilt along a counter-clockwise direction. On the other hand, as portions of the first pillar 23 is fixed in the fixing slot 225 or the fixing hole and other portions bears the elastic force from the elastic piece 28, the light guiding plate 22 does not tilt along a first clockwise trend. The direction of the elastic force is parallel to the direction of the substrate 21 toward the light source 25, 26. The elastic force applies to the assembly including the light guiding plate 22 and the first pillar 23. The elastic force of the elastic piece 28 may push the light guiding plate 22 to tilt along a second counter-clockwise trend. That is, the light incident surface of the light guiding plate 22 tilt into a direction which is getting farther away from the light source 25, 26. The first clockwise trend counteracts with the second counter-clockwise trend so that the light incident surface of the light guiding plate 22 is in a balanced state. In conclusion, the light incident surface of the light guiding plate 22 remains balanced and thus the coupling distance of the upper portion of the light incident surface is the same with that of a down portion of the light incident surface.

In other embodiments, the backlight module 20 may not include the second pillar 24. That is, the second end 282 of the elastic piece 28 connects to the substrate 21 directly.

It is understood that by arranging the separating pieces 27 between the first edge 221 of the light guiding plate 22 and the base 25 of the light source, the first edge 221 of the light guiding plate 22 and the lighting assembly 26 of the light source have the minimum distance D. As the elastic force from the elastic piece 28 pushes the light guiding plate 22 to move toward the light source 25, 26 via the first pillar 23, the distance between the light guiding plate 22 and the lighting assembly 26 of the light source is controlled to be equal to the minimum distance D. At this time, the elastic piece 28 remains in the compressed state so that the coupling distance remains unchanged.

Figure 8:
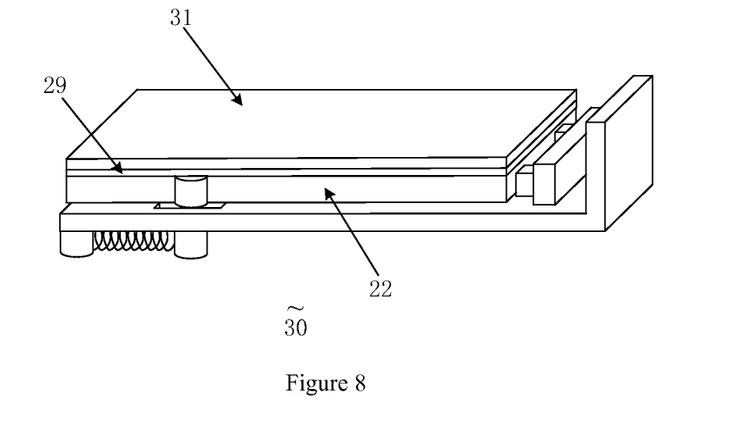
FIG. 8 is a perspective view of the liquid crystal display in accordance with one embodiment.

FIG. 8 is a perspective view of the liquid crystal display in accordance with one embodiment. The liquid crystal display 30 includes a display panel 31 and a backlight module 20. The backlight module 20, as shown in FIGS. 3-7, includes a substrate 21, a light guiding plate 22, at least one optical film 29, a first pillar 23, a second pillar 24, light sources 25, 26, separating pieces 27, and an elastic piece 28. The light guiding plate 22 is arranged on the substrate 21. The light guiding plate 22 includes a first edge 221, a second edge 222, a third edge 223, and a fourth edge 224 connected to each other head to tail. The second edge 222 or the fourth edge 224 of the light guiding plate 22 has a fixing slot 225 or the fixing hole. The display panel 31 is arranged on the first surface of the light guiding plate 22. The optical film 29 is arranged between the light guiding plate 22 and the display panel 31. The optical film 29 may be an optical diffuser film or an optical brightness enhancement film.

The light source 25, 26 includes a base 25 and a lighting assembly 26 arranged on the base 25. The lighting assembly 26 faces toward the first edge 221 of the light guiding plate 22. The separating pieces 27 are arranged between the first edge 221 of the light guiding plate 22 and the base 25 of the light source such that the first edge 221 of the light guiding plate 22 and the lighting assembly 26 of the light source have the minimum distance D. The thickness T of the separating pieces 27 is equal to or larger than the thickness of the light guiding plate 22. The backlight module 20 includes at least two separating pieces 27 respectively correspond to two sides of the first edge 221 of the light guiding plate 22

At least portions of the first pillar 23 are fixed on the fixing slot 225 or the fixing hole of the light guiding plate 22. In addition, at least portions of the first pillar 23 protrudes from the light guiding plate 22 so that the protruded portions of the first pillar 23 pass through the crack 211 of the substrate 21. The lengthy direction of the crack 211 is the same with the moving direction of the light guiding plate 22 toward the light source 25, 26.

The second pillar 24 is vertically fixed on the first surface of the substrate 21. The elastic piece 28 is also arranged on the first surface of the substrate 21. The elastic piece 28 includes a first end 281, and a second end 282. The first end 281 of the elastic piece 28 connects one end of the first pillar 23 passing through the crack 211 of the substrate 21. The second end 282 of the elastic piece 28 connects the second pillar 24. The second end 282 of the elastic piece 28 is farther to the first edge 221 of the light guiding plate 22 than the first end 281. As the elastic force from the elastic piece 28 pushes the light guiding plate 22 to move toward the light source 25, 26 via the first pillar 23, the distance between the light guiding plate 22 and the lighting assembly 26 of the light source is controlled to be equal to the minimum distance D. At this time, the elastic piece 28 remains in the compressed state such that the coupling distance remains unchanged.

The liquid crystal display 30 may be a thin film transistor-liquid crystal display (TFT-LCD), or other kinds of LCDs.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. A backlight module, comprising:
 a substrate, a light guiding plate, a first pillar, a light source, at least two separating pieces, and an elastic piece;
 wherein the light guiding plate is arranged on the substrate, the light guiding plate comprises a first edge, a second edge, a third edge and a fourth edge connected to each other head to tail, the light source is arranged adjacent to the first edge, the second edge or the fourth edge of the light guiding plate has a fixing slot or a fixing hole;
 the light source comprises a base and a lighting assembly arranged on the base, the lighting assembly faces toward the first edge of the light guiding plate, the separating pieces are arranged between the first edge of the light guiding plate and the base of the light source such that the first edge of the light guiding plate and the lighting assembly of the light source have a minimum distance;
 at least portions of the first pillar are fixed on the fixing slot or the fixing hole of the light guiding plate, at least portions of the first pillar protrudes from the light guiding plate so that the protruded portions of the first pillar pass through a crack of the substrate;
 the elastic piece is arranged on a first surface of the substrate, the first surface is farther to the light guiding plate than the other surface, the elastic piece comprises a first end, and a second end, the first end of the elastic piece connects one end of the first pillar passing through the crack of the substrate, the second end connects to the substrate directly or indirectly, and the second end of the elastic piece is farther to the first edge of the light guiding plate than the first end;
 the elastic piece pushes the light guiding plate via the first pillar to move toward the right source until the distance between the light guiding plate and the lighting assembly of the light source equals to the minimum distance, and the elastic piece remains in a compressed state;
 a lengthy direction of the crack is the same with a moving direction of the light guiding plate toward the light source; and
 a thickness of the at least two separating pieces is equal to or larger than the thickness of the light guiding plate, and the at least two separating pieces respectively correspond to two sides of the first edge of the light guiding plate.

2. The backlight module as claimed in claim 1, wherein backlight modules further comprises a second pillar vertically fixed on the first surface of the substrate, and the second end of the elastic piece connects the second pillar.

3. The backlight module as claimed in claim 1, wherein the elastic piece is springs.

4. The backlight module as claimed in claim 1, wherein the backlight module further comprises at least one optical film arranged on the first surface of the light guiding plate.

5. A backlight module, comprising:
 a substrate, a light guiding plate, a first pillar, a light source, separating pieces, and an elastic piece;
 wherein the light guiding plate is arranged on the substrate, the light guiding plate comprises a first edge, a second edge, a third edge and a fourth edge connected to each other head to tail, the light source is arranged adjacent to the first edge, the second edge or the fourth edge of the light guiding plate has a fixing slot or a fixing hole;
 the light source comprises a base and a lighting assembly arranged on the base, the lighting assembly faces toward the first edge of the light guiding plate, the separating piece is arranged between the first edge of the light guiding plate and the base of the light source such that the first edge of the light guiding plate and the lighting assembly of the light source have a minimum distance;
 at least portions of the first pillar are fixed on the fixing slot or the fixing hole of the light guiding plate, at least portions of the first pillar protrudes from the light guiding plate so that the protruded portions of the first pillar pass through a crack of the substrate;
 the elastic piece is arranged on a first surface of the substrate, the first surface is farther to the light guiding plate than the other surface, the elastic piece comprises a first end, and a second end, the first end of the elastic piece connects one end of the first pillar passing through the crack of the substrate, the second end connects to the substrate directly or indirectly, the second end of the elastic piece is farther to the first edge of the light guiding plate than the first end;
 the elastic piece pushes the light guiding plate via the first pillar to move toward the light source until the distance between the light guiding plate and the lighting assembly of the light source equals to the minimum distance, and the elastic piece remains in a compressed state; and
 a lengthy direction of the crack is the same with a moving direction of the light guiding plate toward the light source.

6. The backlight module as claimed in claim 5, wherein a thickness of the at least two separating pieces is equal to or larger than the thickness of the light guiding plate.

7. The backlight module as claimed in claim 5, wherein the backlight modules further comprises a second pillar vertically fixed on the first surface of the substrate, and the second end or the elastic piece connects the second pillar.

8. The backlight module as claimed in claim 5, wherein the elastic piece is springs.

9. The backlight module as claimed in claim 5, wherein the backlight modules comprises at least two separating pieces respectively correspond to two sides of the first edge of the light guiding plate.

10. The backlight module as claimed in claim 5, wherein the backlight module further comprises at least one optical film arranged on the first surface of the light guiding plate.

11. A liquid crystal display, comprising:
 a backlight module, comprising:
 a substrate, a light guiding plate, a first pillar, a light source, separating pieces, and an elastic piece;
 wherein the light guiding plate is arranged on the substrate, the light guiding plate comprises a first edge, a second edge, a third edge and a fourth edge connected to each other head to tail, the light source is arranged adjacent to the first edge, the second edge or the fourth edge of the light guiding plate has a fixing slot or a fixing hole;

the light source comprises a base and a lighting assembly arranged on the base, the lighting assembly faces toward the first edge of the light guiding plate, the separating piece is arranged between the first edge of the light guiding plate and the base of the light source such that the first edge of the light guiding plate and the lighting assembly of the light source have a minimum distance;

at least portions of the first pillar are fixed on the fixing slot or the fixing hole of the light guiding plate, at least portions of the first pillar protrudes from the light guiding plate so that the protruded portions of the first pillar pass through a crack of the substrate;

the elastic piece is arranged on a first surface of the substrate, the first surface is farther to the light guiding plate than the other surface, the elastic piece comprises a first end, and a second end, the first end of the elastic piece connects one end of the first pillar passing through the crack of the substrate, the second end connects to the substrate directly or indirectly, the second end of the elastic piece is farther to the first edge of the light guiding plate than the first end;

the elastic piece pushes the light guiding plate via the first pillar to move toward the light source until the distance between the light guiding plate and the lighting assembly of the light source equals to the minimum distance, and the elastic piece remains in a compressed gate;

a lengthy direction of the crack is the same with a moving direction of the light guiding plate toward the light source; and a display panel arranged on the first surface of the light guiding plate.

12. The backlight module as claimed in claim 11, wherein a thickness of the at least two separating pieces is equal to or larger than the thickness of the light guiding plate.

13. The backlight module as claimed in claim 11, wherein the backlight modules further comprises a second pillar vertically fixed on the first surface of the substrate, and the second end of the elastic piece connects the second pillar.

14. The backlight module as claimed in claim 11, wherein the elastic piece is springs.

* * * * *